US009746386B2

(12) United States Patent
Jenkins

(10) Patent No.: US 9,746,386 B2
(45) Date of Patent: Aug. 29, 2017

(54) APPARATUS AND METHODS FOR MEASUREMENTS OF PRESSURE

(71) Applicant: Advanced Sensor Design Technologies, LLC, Houston, TX (US)

(72) Inventor: Keith Jenkins, Houston, TX (US)

(73) Assignee: ADVANCED SENSOR DESIGN TECHNOLOGIES, LLC, Houston, TX (US)

(*) Notice: Subject to any disclaimer, the term of this patent is extended or adjusted under 35 U.S.C. 154(b) by 248 days.

(21) Appl. No.: 14/297,774

(22) Filed: Jun. 6, 2014

(65) Prior Publication Data

US 2014/0360279 A1 Dec. 11, 2014

Related U.S. Application Data

(63) Continuation of application No. 29/457,023, filed on Jun. 6, 2013, now Pat. No. Des. 718,163, and a continuation of application No. 29/457,041, filed on Jun. 6, 2013, now Pat. No. Des. 718,164, and a continuation of application No. 29/481,735, filed on Feb. 10, 2014, now Pat. No. Des. 730,762.

(60) Provisional application No. 61/831,846, filed on Jun. 6, 2013, provisional application No. 61/868,293, filed on Aug. 21, 2013.

(51) Int. Cl.
*G01L 1/22* (2006.01)

(52) U.S. Cl.
CPC ............................. *G01L 1/22* (2013.01)

(58) Field of Classification Search
CPC ....... G01L 19/00; G01L 19/0007; G01L 5/24; G01L 1/22; G01N 11/00; G06F 19/00; B23D 21/08; B23D 21/06; B23K 37/053

USPC .............................................. 73/756
See application file for complete search history.

(56) References Cited

U.S. PATENT DOCUMENTS 3,309,002 A * 3/1967 Enos .................. B23D 21/00
225/103
4,290,311 A 9/1981 Brewer
(Continued)

FOREIGN PATENT DOCUMENTS

GB 2454220 A 5/2009

OTHER PUBLICATIONS

Search Report and Written Opinion dated Oct. 27, 2014 for co-pending PCT App. No. PCT/US14/41220.
(Continued)

*Primary Examiner* — Lisa Caputo
*Assistant Examiner* — Octavia Hollington
(74) *Attorney, Agent, or Firm* — D'Ambrosio & Menon, PLLC; Usha Menon

(57) ABSTRACT

A strapping device for a pipe and methods of using the strapping device to non-invasively detect pressure inside the pipe and the residual stress exerted on the pipe. The strapping device includes a linked or a solid band adapted to be fitted around an outside diameter of the pipe. The strapping device further includes a sensor for measuring at least one of a change in the outside diameter of the pipe due to a corresponding change in pressure inside the pipe and to detect the stress or strain transferred from the pipe. The measurements can be conveniently processed in a circuit board coupled to the strapping device or in a remote location. The measurements can be transmitted through wires or digitally transmitted to the circuit board.

20 Claims, 4 Drawing Sheets

(56) References Cited

U.S. PATENT DOCUMENTS

| | | | |
|---|---|---|---|
| 4,425,800 A | | 1/1984 | Claassen |
| 4,573,359 A | | 3/1986 | Carstensen |
| 4,586,647 A | * | 5/1986 | Dearman ................. F16L 3/20 228/49.3 |
| 4,757,977 A | * | 7/1988 | Krieg ................. B23K 37/0217 266/56 |
| 4,825,674 A | * | 5/1989 | Tanaka .................... C21D 7/02 72/367.1 |
| 6,497,159 B1 | | 12/2002 | Lavoie et al. |
| 6,550,342 B2 | * | 4/2003 | Croteau ................. G01D 5/268 73/800 |
| 7,058,549 B2 | | 6/2006 | Gysling et al. |
| 7,150,202 B2 | * | 12/2006 | Gysling ................... G01F 1/74 702/45 |
| 7,308,820 B2 | | 12/2007 | Engel |

OTHER PUBLICATIONS

EPO Search Report dated Sep. 13, 2016 for co-pending related EP Application No. 14808392.6-1557.

* cited by examiner

APPARATUS AND METHODS FOR MEASUREMENTS OF PRESSURE

CROSS-REFERENCE TO RELATED APPLICATION(S)

This application claims priority to U.S. Provisional Application No. 61/831,846, filed Jun. 6, 2013 and to U.S. Provisional Application No. 61/868,293, filed Aug. 21, 2013, and this is application is a continuation of the following Design patent applications: Ser. No. 29/457,023 and 29/457,041, both filed Jun. 6, 2013 and Ser. No. 29/481,735 filed Feb. 10, 2014.

FIELD OF INVENTION AND BACKGROUND

Pipes and vessels are used to convey fluids. Fluids are substances having a continuous phase that tends to flow and to conform to the outline of its container under the application of stress. A fluid can be a liquid, such as water and oil, or gas.

Pipes may be subjected to internal pressure due to fluids flowing inside the pipe. Pressure is an example of stress, and acts inward, toward the surface, and perpendicular to the surface. Pressure can be stated as the force required to stop a fluid from expanding, and is calculated as force per unit area. Internal pressure inside the pipe may also give rise to axial stresses on the pipe wall. A pressure sensor or transducer is used to measure the pressure of fluids. A transducer can generate a signal, for example, an electrical signal, as a function of the pressure imposed. Pressure transducers are used in a number of industries and for monitoring and controlling a variety of industrial, commercial and residential applications.

The present invention relates to an apparatus for measuring the internal pressure of a pipe. In particular, the present invention relates to apparatus for measuring the internal pressure of a pipe in a non-invasive manner.

SUMMARY OF THE INVENTION

According to one embodiment, a strapping device for measuring pressure inside a pipe is disclosed. The strapping device includes: (i) a band for secureable clamping onto an outer surface of the pipe; and (ii) a sensor, wherein the sensor is installed on the band. The strapping device is configured for non-invasively sensing and measuring at least one of: (a) a change in an outer diameter of the pipe; and (b) a change in a residual stress exerted on the pipe. The change in the outer diameter of the pipe or the change in the residual stress exerted on the pipe can be associated with a corresponding change in pressure inside the pipe. This allows the change in inside pressure to be measured conveniently and accurately.

The band may be a solid band or it may include a plurality of detachable linked elements. Each of the linked elements may include a pair of opposing through-holes for coupling to an adjacent linked element.

Since the strapping device is attached to an outside surface of the pipe, it can measure the change in pressure inside the pipe without penetrating any component of the strapping device piercing or penetrating the inside of the pipe. None of the components of the strapping device lie within and obstruct the path of a fluid that may be transported in the pipe. Furthermore, the strapping device is configured to measure the change in pressure inside the pipe without requiring any modifications to the pipe.

The strapping device may also include a cooperative circuit board in communication with the sensor. The cooperative circuit board may enclose a processor. The strapping device further includes a tensioning assembly that is operatively connected to the band for facilitating the secureable clamping onto the outer surface of the pipe. The tensioning assembly comprises one or more screws. The strapping assembly further includes one or more removable pins for facilitating the secureable clamping onto the outer surface of the pipe.

The sensor may include one or more strain gauges. The sensor can be adapted to measure the change in pipe diameter or changes in the residual stress periodically or on a continual basis.

According to an embodiment, the strapping device can be pre-calibrated based on one or more known characteristics of the pipe. The pre-calibration may be completed prior to installing the strapping device onto the pipe. The pre-calibration may involve determining a change in the outer diameter of the pipe or the residual stress under a plurality of pressure conditions.

The strapping device can be configured to wirelessly transmit the measured change in outer diameter of the pipe and/or the stress exerted on the pipe to a remote location.

According to another embodiment, a method for non-invasively measuring pressure inside the pipe is disclosed. The method involves: (A) installing a strapping device onto an outer surface of the pipe, the strapping device comprising: (i) a band for secureably clamping onto the outer surface of the pipe; and (ii) a sensor, wherein the sensor is installed on the band, and wherein the sensor is in operative communication with a processor; and (B) measuring, using the processor, a change in residual stress exerted on the pipe, wherein the change in the residual stress exerted on the pipe is associated with a corresponding change in pressure inside the pipe. The stress in the pipe can be measured to determine the existence or absence of pressure in the pipe.

When a pipe is exposed to pressure, the pipe material becomes stressed. This can cause a change in the pipe diameter. This change in pipe diameter can be measured and the corresponding pressure can be calculated based on predetermined calculations. The strapping device can be configured to sense the change in the outside diameter of the pipe on a periodic or continual basis and can calculate that change to determine at how much pressure it would take to cause that change in the outer diameter of the pipe.

Stress from the pipe can be configured to be transferred to the band. If the zero point is already under stress, then an expansion or stress in the pipe can be transferred to the band where it can be measured or when the diameter is measured, According to another embodiment, a method for non-invasively detecting pressure inside a pipe is disclosed. The method involves: (A) installing a strapping device onto an outer surface of the pipe, the strapping device comprising: (i) a band for secureably clamping onto the outer surface of the pipe; and (ii) a sensor, wherein the sensor is installed on the band, and wherein the sensor is in operative communication with a processor; and (B) measuring, using the processor, a change in an outer diameter of the pipe, wherein the change in the outer diameter of the pipe is associated with a corresponding change in pressure inside the pipe.

The strapping device can be dynamically calibrated, using a smart calibration method, during its installation or it can be pre-calibrated at a manufacturing facility.

The strapping device may measure the pressure inside the pipe in a non-invasive or non-intrusive manner. This minimizes the possibility of leaks or spills of hazardous material.

Therefore, any detrimental impact to the environment can also be substantially eliminated.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE PREFERRED EMBODIMENT

Figure 1:
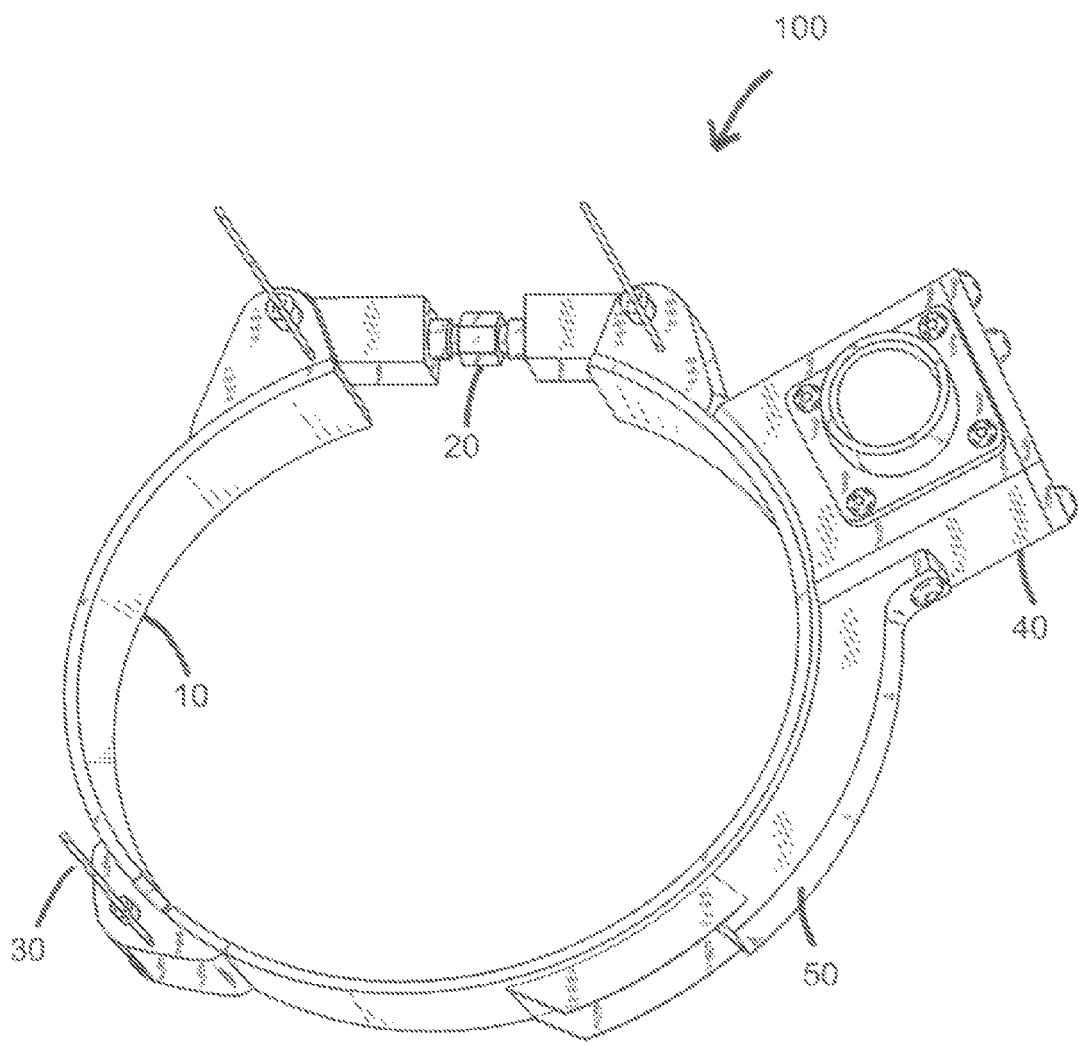
FIG. 1 illustrates a perspective view of a solid band type strapping device in accordance with one embodiment of the invention.

As used herein, the words "comprise," "have," "include," and all grammatical variations thereof are each intended to have an open, non-limiting meaning that does not exclude additional devices or steps.

Pipes, vessels, tanks and other similar fluid containing and conveying devices are collectively referred to herein as "pipes." The pipes may be process piping. Pipes and process pipes are used interchangeably in this document. Process piping is a form of pipework that may be used for transporting materials used in industrial or commercial processes and in manufacturing. Process piping may be specially configured for a specific application such that it can meet health, safety and regulatory standards while suiting the needs of a given manufacturing process. Process piping can be used to transport many materials, for example, chemicals, natural gas, oil and even food.

Pipes are typically made of various materials, including one or more metals, plastic, or other materials. The types of materials that will be transported by the piping may dictate the piping material. For instance, there may be special needs like inert glass or ceramic piping, corrosion-resistant stainless steel that can be sterilized in a food manufacturing facility, or inexpensive plastics for transporting materials like water. Other considerations involved in the selection of the piping material include the amount of pressure the piping will be subjected to and the width of the piping. Under pressure, the pipe material may be subjected to stress.

Traditional methods for measuring the amount of pressure that the piping is subjected to involve cutting the pipe open to insert a pressure transducer. These methods are mostly intrusive methods. This has many disadvantages because the transducer is introduced within, for example, the path of fluids transported by the piping. Traditional methods of mounting a transducer may interfere with the fluid flow and cause a modification of the product set up. Pressure transducers used in this manner can have or create a leak path for hazardous material. There is a possibility that the pressure transducer could be improperly mounted or inserted inside the pipe. When subjected to high pressure, it could be dislodged, thereby posing a danger to personnel mounting the pressure transducer. Additionally, pressure transducers inserted within pipes may display pressure measurements inaccurately because of the turbulent flow of fluid within the pipe. Accordingly, there is a need for a pressure measurement device that is non-intrusive and can accurately measure pressure without interfering with the fluid flow.

According to one or more embodiments, a strapping device for a pipe and methods of using the strapping device to non-invasively detect pressure inside the pipe and the residual stress exerted on the pipe are disclosed. The strapping device can include a linked band or a solid band adapted to be fitted around an outside diameter of the pipe. The strapping device can also include a sensor for measuring at least a change in the outside diameter of the pipe. The change in the outside or outer diameter of the pipe is associated with a corresponding change in pressure inside the pipe. The pipe may contract or expand due to the change in pressure. This causes a corresponding change in the outside diameter of the pipe. This change in diameter is transferred from the pipe to the linked or solid band. The strapping device can further detect the residual stress or strain in the pipe. The residual stress or strain is also transferred from the pipe to linked or solid band. The strapping device further includes a sensor for measuring the change in the outside diameter or residual stress. The measurements can be conveniently processed in a circuit board coupled to the strapping device or in a remote location. The measurements can be transmitted through wires or digitally transmitted to the circuit board.

As used herein, the term "band" shall include a cuff, a strap or any similar bracelet-like device that can encircle or be wrapped around at least a portion of pipe. As used herein, the term "sensor" shall include a photoelectric cell or any device that can detect or measure pressure or a change in the residual stress or outer diameter of a pipe. As used herein, the term "outside diameter" or "outer diameter" shall include the distance across the exterior of the pipe.

As disclosed herein, a novel method for measuring the pressure within a pipe involves detecting and measuring changes, if any, to the outside diameter of the pipe under varying pressures and stress by monitoring and measuring dimensional changes in the pipe. The stress in the pipe can be measured to determine the existence or absence of pressure in the pipe. Advantageously, the pressure inside a pipe can be measured without the need for cutting the pipe open to insert a pressure transducer inside the pipe. Pressure changes can be monitored without modifying the pipe. Accordingly, the rig up time can be faster and it can also eliminate costly downtime. Since this is a non-invasive method, the possibility of leaks or spills of hazardous material into the environment can also be substantially eliminated.

In accordance with the one or more embodiments of the invention, a strapping device for measuring pressure inside a pipe or a process pipe is disclosed. The strapping device can be installed on the outside diameter of the pipe. As used herein, the term "strapping device" can refer to a pressure transducer, pressure transmitter, pressure sender or pressure indicator that is configured to be strapped or clamped or fastened around an outside diameter of a pipe. Since the strapping device is fastened on the outside of the pipe, it can be simpler to install and calibrate. The strapping device can conveniently measure the pressure inside a pipe without having to penetrate the pipe.

As mentioned earlier, when a pipe is exposed to pressure, the pipe material becomes stressed and the pipe diameter can change. For example, the pipe material can expand or contract. Under certain circumstances, this change may be just a slight or incremental change. In accordance with the one or more embodiments of the invention, the external diameter of the pipe can be measured. Once this diameter is measured, the corresponding pressure can be calculated based on certain predetermined calculations. The pipe diameter can be measured periodically or continually and the associated pressure can be calculated dynamically or automatically on a real-time basis. The term "real time" can include any time frame of sufficiently short duration. The term "real time" shall also include "near real time" or "substantially in real time"—this may include within a few seconds to less than a minute in certain pipes. Various measurement techniques can be utilized. Each measurement technique can have different benefits and the actual technique chosen could be for varying reasons.

In accordance with embodiments of the invention, the measurement of the pipe diameter need not be linear. The measurement can be adjusted or calibrated by circuit design or it can be calculated by a circuit board and/or by signal processing. In accordance with one or more embodiments, the strapping device may include a band. The band may be a solid band or it may include multiple linked devices. Irrespective of the type of band, the band can be configured to detect stress in the pipe. If the zero point is already under stress, then an expansion or stress in the pipe can be transferred to the band where it can be measured.

According to the one or more embodiments of the invention, a method for measuring the pressure change involves a preliminary calibration step. If information on the pipe can be obtained in advance, calibration can involve, for example, at least one of the following non-limiting steps: 1) determining the pipe characteristics and using this information to calibrate a circuit board to produce an output that is representative of a calculated pressure; and 2) calibrating the strapping device against a pipe at, for instance, a manufacturing facility, where the pipe can ideally/optimally be of the same size, type and material make-up as the pipe on which the strapping device is intended to be used.

Applicant has determined that once the final installation at the field location sets the pre-stress to the same measurement as the calibration pre-stress, the pressure measurements can be representative of the calibrated output. During the installation, a pressure reference point can be determined to match the calibrated value of the strapping device in order to complete the initial set-up of the strapping device. For instance, the process can be temporarily stopped while ensuring that the pipe is at zero pressure. Then, the pre-stress of the installation can also be adjusted to be zero at that point. After the pre-stress is set, the pressure readings from the strapping device can be determined.

In yet another embodiment, the strapping device can be dynamically calibrated in accordance with a smart calibration method proposed by the Applicant. The dynamic calibration can be conducted at the installation site. Temperature or other effects, such as paint on the pipe, can be adjusted and accounted for during the calibration of the Strapping device.

Figure 2:
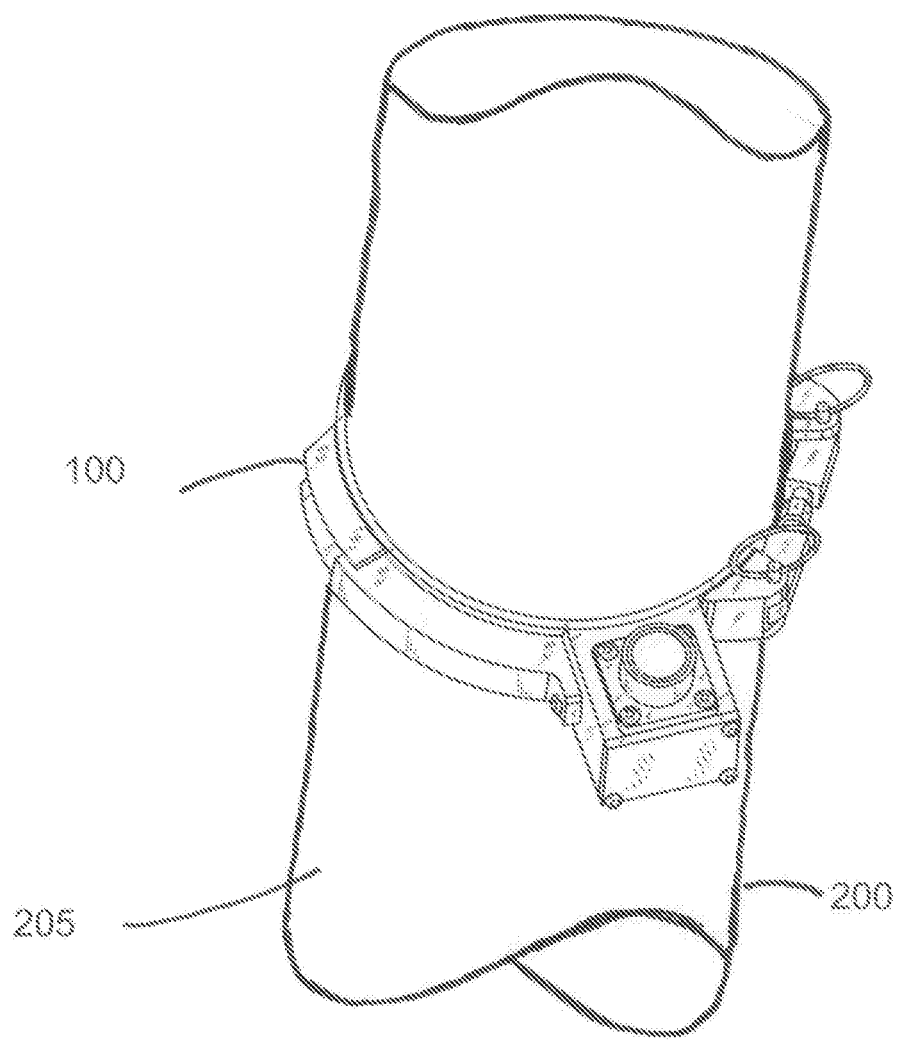
FIG. 2 illustrates a view of the strapping device strapped to an outside surface of a pipe in accordance with an embodiment of the invention.

Turning now to the figures, FIG. 1 depicts a strapping device 100 in accordance with one or more embodiments of the invention. As shown in FIG. 2, the strapping device 100 can be positioned and fastened to an outer surface 205 of a pipe 200. Turning back to FIG. 1, the strapping device 100 can include a band 10, one or more tensioning screws 20, multiple removable pins 30, a Circuit Board Enclosure 40. The Circuit Board Enclosure 40 may include circuit board/processor/circuitry and one or more closures 50. The closure 50 may enclose one or more sensors (not shown) which may be connected to the circuitry in the Circuit Board Enclosure 40.

Figure 3:
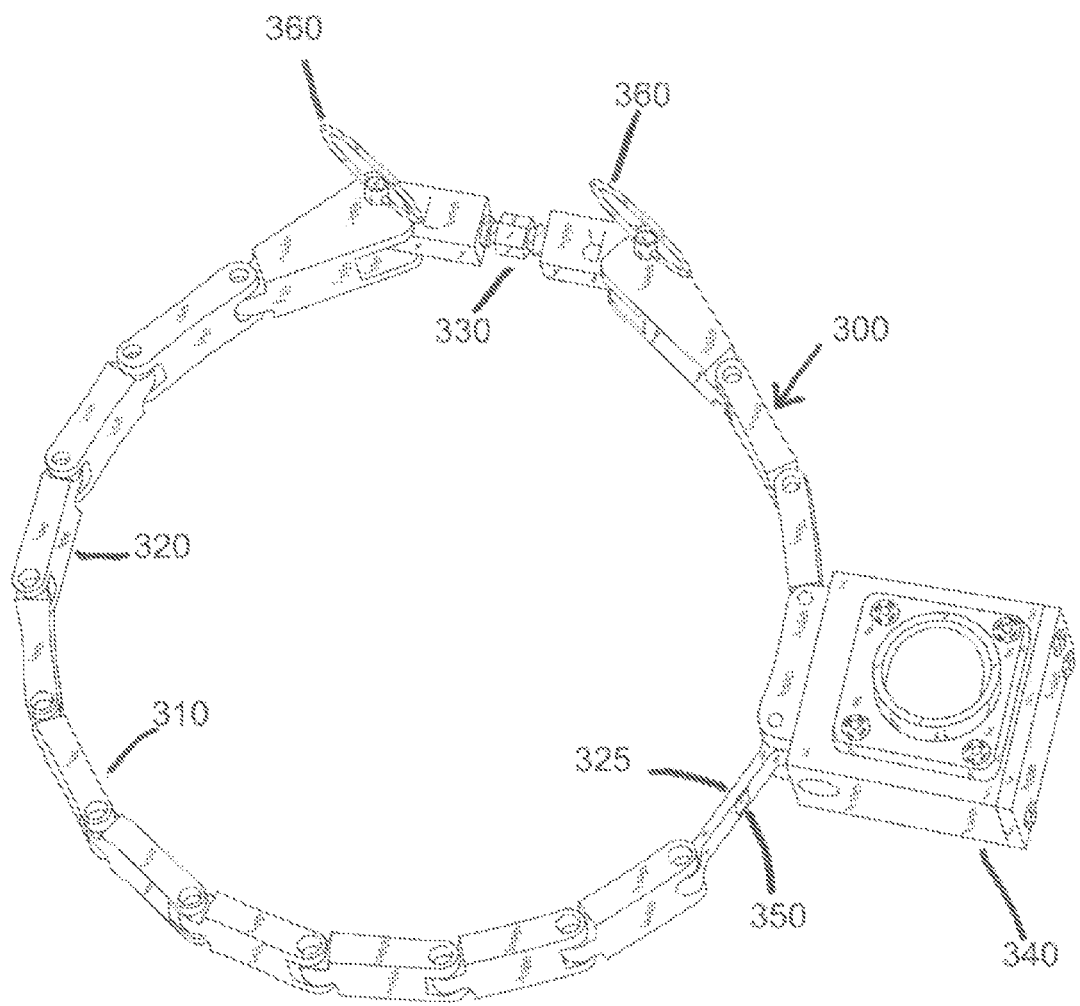
FIG. 3 illustrates a perspective view of a linked band type strapping device in accordance with another embodiment of the invention.

A preferred embodiment is depicted in FIG. 3. As shown in FIG. 3, the strapping device 300 can be made of a plurality of linked elements or links 320. The links 320 can be arranged to form a band 310. This chained or linked band 310 can be sized to substantially match the outer diameter of the process piping. At least a pair of links 320 can be coupled to a tensioning assembly 330. The tensioning assembly 330 can be used for tensioning or tightening the strapping device 300 to an outer surface of a pipe (similar to the arrangement shown in FIG. 2). The tensioning assembly 330 may include one or more screws. As used herein, the term "screw" shall include a bolt, a nut or any fastening device that can be tightened.

The strapping device 300 can also include a Circuit Board Enclosure 340. At least one sensor 350 can be mounted on or in communication with a straight measuring link 325. The straight measuring link 325 may be positioned adjacent to the Circuit Board Enclosure 340. The sensor 350 can include one or more sensors or strain gauges that can measure stress and changes in the outside diameter of the pipe. The strapping device 300 can also include at least one pair of removable pins 360.

Figure 4A:
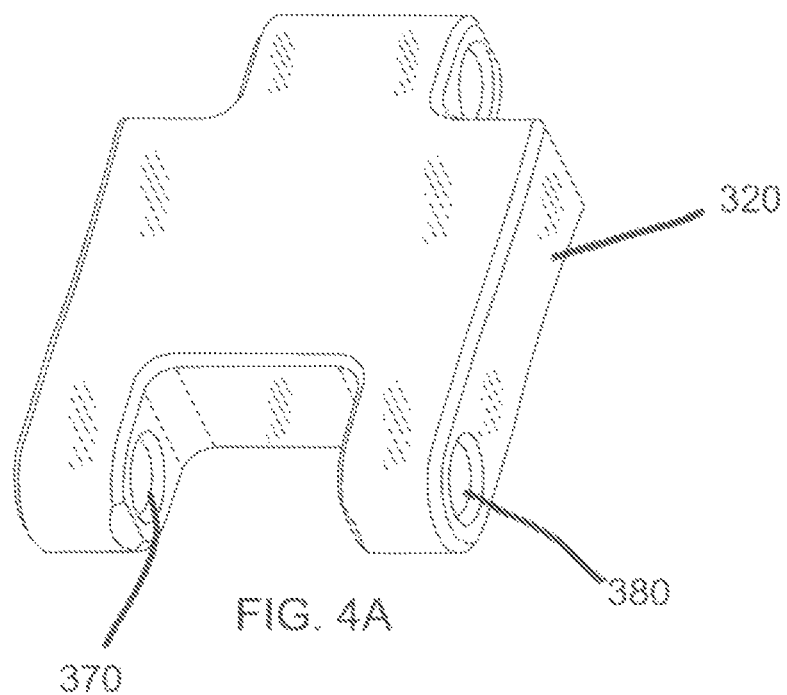
FIGS. 4A and 4B illustrate a perspective view of a linked element in accordance with one embodiment of the invention.
Figure 4B:
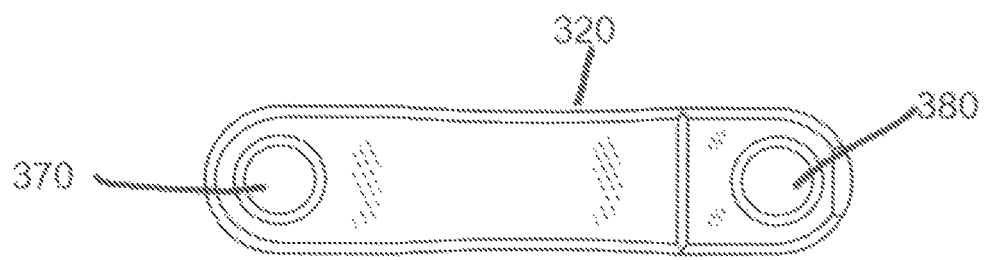

FIGS. 4A and 4B show two views of the link 320. As shown, links 320 can include a pair of opposing throughholes 370 and 380 for coupling with an adjacent link 320.

Referring back to FIG. 3, the links 320 can be configured to provide flexibility to adjust to different ranges of pipe diameters. Depending on the outer diameter of the pipe on which the strapping device 100 will be installed, one or more links 320 can be added or detached to increase or decrease the overall diameter of the band 310. The band 310 can adapt to different radius. The links 320 may remove any stray bending stresses from the linked band 310 to more accurately transfer the stress from a pressurized pipe.

The straight measuring link 325 can help to isolate the transferred stress measurements into a straight measurement. This may remove any stray errors from stress that could be related to a potential bending of the sensors 350 mounted on a surface of the straight measuring link 325. The straight measuring link 325 may facilitate an alternate measurement of stress, diameter change or other variation of technique.

The strapping device 300 can be configured to measure strain or stress in a material, such as, for example the material used to construct the pipe. Stress or strain in the pipe or the process pipe can be transferred to the band 310. The sensor 350 can detect and measure the transferred stress from the band 310. The sensor 350 can communicate this information to the circuit board or circuitry (not shown) enclosed by the Circuit Board Enclosure 340.

It can be difficult and complex to install strain gauges on process pipes in the field. Advantageously, the one or more embodiments of the present invention allow for the convenient measurement of pipe stress/strain by using a strapping device 300 that is pre-configured with a sensor 350.

According to the one or more embodiments of the invention, the measurement of pressure involves transferring stress induced by fluid flow in pipes from the pipe into the strapping device. The strapping device can include a sensor. Before acquiring data in the strapping device, the sensor is zeroed to ensure accurate operation. If the sensor is zeroed under stress, any expansion or stress in the process pipe may be transferred to the strapping device where it can be then measured. In another embodiment, the sensor of the strapping device can be configured to measure changes in the outer diameter of the process pipe.

The circuit board can be calibrated when information about the pipe is available in advance. In one embodiment, the calibration of the circuit board involves calculating one or more characteristics of the pipe at one or more predetermined pressure values; and using the calculations to calibrate the circuit board such that the strapping device can provide a measurement that is representative of a measurement at the one or more predetermined pressure values.

In another embodiment, the strapping device can be calibrated at a manufacturing facility against a pipe having a substantially same size, type and material make-up as the intended process pipe. If during the final installation, such as, at the field location, a user can set a pre-stress measurement to match a calibration pre-stress measurement, the actual measurement can be representative of the calibrated measurement. During installation, in order to do an initial set-up, a user can determine a pressure reference point to substantially match the calibrated value of the strapping device. For example, the user (such as, an operator) can temporarily stop the physical process. When the physical process is stopped, the pressure of process pipe may be zero. This can allow the user to match the pre-stress measurement of the strapping device to be set at zero at that point. Once the pre-stress is set, the pressure readings from the strapping device will be known.

In yet another embodiment, the circuit board may be calibrated at the installation site by one or more smart calibration methods. The method involves installing the strapping device to a reasonable predetermined value at zero pressure. The circuit board can take this as a zero reference value. The method further involves making additional measurements at one or more other known pressure points to finish the calibration process.

In all cases, the temperature or other one or more other factors, for example, paint on the process pipe can be adjusted.

In another embodiment, the strapping device 300 can be configured to transmit strain/diameter information to the circuit board wirelessly (not shown). A battery or similar power source can be placed inside the Strapping device 300 to eliminate the need for a connector. This facilitates the use of the Strapping device 300 in remote areas without the requirement of any cables and without the need for penetrating or cutting open the pipe.

The Strapping device 300 can further include an output display (not shown). The output comprises one of an analog 2 wire 4-20 mA output, a digital output or a wireless output.

The band 310 can communicate any stress detected in the piping to the sensors 350. Alternately, the band 310 can communicate any changes in a pipe's outer diameter to the sensors 350 as the pressure inside the pipe changes. As described earlier, the band 310 can be made of multiple detachable links 320. The links 320 can be held in place by the removable pins 360.

The various components of the strapping device 300, including the links 320, can be made of a material that can match the expansion coefficients of the pipe. When the expansion rate of the pipe and the strapping device 300 are substantially similar or exact, any effect on the piping due to a change in temperature may be controlled. However, in accordance with an embodiment of the invention, even if the expansion coefficients of the materials do not match, for example, because the selection of the material for the strapping device 300 is overridden due to the corrosive environment of the application etc., the temperature effects can, nevertheless, be mitigated.

The temperature effects can be mitigated either through circuitry design or through the selection of a smart circuit. The effects of the process pipe can be learned, calculated or measured. The information may be used during either a calibration process or a "smart process" where the band learns and equates the change to a pressure. This can be done by a process similar to comparing the measured parameters against a calibration device or by entering one or more known mechanical properties of the pipe.

According to an embodiment of the invention, when the pipe is a plastic pipe which may be affected by heat, the band 310 may also be made of plastic or such similar material. Alternately, the effects of temperature on the pipe material can be pre-calculated to allow for a suitable matching of an appropriate band 310 material with the desired application. In many industries, the band 310 material may be selected in dependence on its resistance to fluids, gases, such as sour gas, which can affect properties, or corrosion.

In accordance with another embodiment, a method for installing the strapping device 300 on a pipe may involve the step of loosening one or more of the tensioning screws 330 that holds the band 310 together. This is followed by removing at least one of the removable pins 360. The band may, therefore, hinge on the other removable pin 360. The band 310 can be allowed to swing open. The band 310 can be then slid down a pipe until it reaches a previously determined location on the pipe. However, the band 310 can be located anywhere on the pipe. Once the band 310 reaches a previously determined location, it can be swung back together. The removed pin 360 can now be re-inserted to close the band 310. The pressure of the pipe may be then brought down to zero. For instance, the pumps connected to the pipe can be turned off or valves on the pipe can be closed. Tension can be added to the pipe by manipulating/adjusting the tensioning screw 330 until the circuit board or computer program product in the Circuit Board Enclosure 340 also match an original zero point setting used to calibrate the strapping device 300 during the manufacturing phase. After the zero point is set and the pre-stress is matched, the strapping device 300 can be ready for use. A pre-stress at zero may be required in order to hold the strapping device 300 in place without moving after its installation and to get a continuous reading of pressure with respect to the pipe.

In another embodiment, slack can be intentionally left in during the calibration of the circuit board. This slack may act as an overpressure switch for a user of the strapping device 300 such that the strapping device 300 may not start reading (that is, it will not show a signal output) until the expansion of the pipe equals a known pressure. The expansion can take up the additional slack and once this is done, the strapping device 300 can send out a signal at the pre-set pressure.

After the strapping device 300 can be calibrated and installed, the pressure measured by the strapping device 300 may be substantially similar to that of a similarly calibrated pressure transducer/sensor that penetrates the pipe. Since those skilled in the art are familiar with and deploy conventional pressure transducers/sensors, they may be able to easily understand the pressure measurements obtained from the strapping device 300 without any additional training. Thus, strapping device 300 can be a convenient replacement for a conventional pressure transducer/sensor that is already used by the user/client.

The strapping device 300 can be used in any industry where there is a need to measure pressure inside a pipe. For example, it can be used in food processing plants, waste-water facilities, upstream oil and gas operations (for example, drilling, fracking, cementing, etc.), refineries, automobiles, aerospace, etc.

As described herein, the strapping device 300 can monitor pressure after it is clamped onto an external surface of the pipe. Since pressure can be measured without penetrating the pipe, modifications to a standard pipe can be avoided. Since the strapping device 300 can be installed on the outside of the pipe, there is no restriction or resistance to a fluid flow inside the pipe.

Since there is no need to cut or weld the pipe to install the strapping device 300, it is an inherently safer alternative to conventional pressure transducers. Since the strapping device 300 is secureably clamped to the outside surface of the pipe, the possibility of the strapping device 300 flying off of the pipe due to improper installation is substantially reduced or eliminated.

Advantageously, when compared to traditional or conventional pressure transducers, there are multiple HSE/environmental benefits to installing, servicing or removing the strapping device 300 from a pipe that is already in service. Any accidental spills or leaks of potentially hazardous material may be avoided by the use of the strapping device 300. Additionally, personnel who are responsible for installing, servicing, or removing the strapping device 300 do not need to be exposed to toxic or bio-hazardous fluids, such as, but not limited, to waste treatment processes. Safety can be improved because no modification to the pipe is required. This eliminates the need for welds or taps on process pipes which can fail or leak if not done properly. Safety can also be improved due to the fact that no threads may be needed to monitor pipe pressure.

Since there is no need to cut weld or modify the pipe or tank to be monitored, there is a significant cost advantage. Additionally, compared to conventional pressure transducers, the time required to install the strapping device 300 can be substantially reduced since there is no need to stop or interrupt the process to drain the pipe for installation or removal. The time required to install the strapping device 300 can be reduced because of fewer interruptions since there is no need to open, weld or modify the pipe. Advantageously, the strapping device 300 significantly reduces flat time of service hands associated with installing Weco style pressure transducers which can take as much as an entire day.

Although much of the foregoing discussion has been in reference to strapping device 300, it is evident that they are also relevant to the strapping device 100. Skilled artisans may also device other similar designs for the measurement of pressure. All such configurations are encompassed within the scope of this invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While apparatus and methods are described in terms of "comprising," "containing," or "including" various components or steps, the apparatus and methods also can "consist essentially of" or "consist of" the various components and steps.

Moreover, the indefinite articles "a" or "an", as used in the claims, are defined herein to mean one or more than one of the device that it introduces. If there is any conflict in the usages of a word or term in this specification and one or more patent(s) or other documents that may be incorporated herein by reference, the definitions that are consistent with this specification should be adopted.

The invention claimed is:

1. A strapping device for measuring pressure inside a pipe, the strapping device comprising:
   (i) a band for secureable clamping onto an outer surface of the pipe, wherein the band comprises a plurality of detachable linked elements;
   (ii) a substantially straight linked element, wherein a first end of the substantially straight linked element is coupled to at least one detachable linked element;
   (iii) a sensor, wherein the sensor is mounted on the substantially straight linked element; and
   (iv) a circuit board enclosure, wherein the circuit board enclosure is coupled to a second end of the substantially straight linked element,
   wherein the strapping device is configured for non-invasively sensing and measuring at least one of:
      (a) a change in an outer diameter of the pipe; and
      (b) a change in a residual stress exerted on the pipe, wherein the change in the outer diameter of the pipe and the change in the residual stress exerted on the pipe are associated with a corresponding change in pressure inside the pipe,
   wherein each of the linked elements comprises:
      a first pair of opposing through-holes at a first end for coupling to an adjacent linked element, and
      a second pair of opposing through-holes at a second end.

2. The strapping device according to claim 1, wherein the strapping device is configured to measure the change in pressure inside the pipe without penetrating the inside of the pipe.

3. The strapping device according to claim 1, wherein the strapping device is configured to measure the change in pressure inside the pipe without modifying the pipe.

4. The strapping device according to claim 1, wherein the strapping device further comprises a cooperative circuit board in communication with the sensor, wherein the cooperative circuit board comprises a processor.

5. The strapping device according to claim 1, wherein the strapping device further comprises a tensioning assembly operatively connected to the band for facilitating the secureable clamping onto the outer surface of the pipe.

6. The strapping device according to claim 1, further comprising one or more removable pins for facilitating the secureable clamping onto the outer surface of the pipe.

7. The strapping device according to claim 1, wherein the sensor comprises one or more strain gauges.

8. The strapping device according to claim 1, wherein the sensor is adapted to measure the change in pipe diameter periodically or on a continual basis.

9. The strapping device according to claim 1, wherein the strapping device is pre-calibrated based on one or more known characteristics of the pipe.

10. The strapping device according to claim 1, wherein the strapping device is configured to wirelessly transmit the measured change in outer diameter of the pipe to a remote location.

11. The strapping device according to claim 1, wherein the strapping device is configured to wirelessly transmit a measured stress exerted on the pipe to a remote location.

12. A method for non-invasively measuring pressure inside the pipe, the method comprising:
(A) installing a strapping device onto an outer surface of the pipe, the strapping device comprising:
(i) a band for secureably clamping onto the outer surface of the pipe, wherein the band comprises a plurality of detachable linked elements;
(ii) a substantially straight linked element, wherein a first end of the substantially straight linked element is coupled to at least one detachable linked element;
(iii) a sensor, wherein the sensor is mounted on the substantially straight linked element; and
(iv) a circuit board enclosure, wherein the circuit board enclosure is coupled to a second end of the substantially straight linked element, and
(B) measuring, using the processor, a change in residual stress exerted on the pipe, wherein the change in the residual stress exerted on the pipe is associated with a corresponding change in pressure inside the pipe,
wherein each of the linked elements comprises:
a first pair of opposing through-holes at a first end for coupling to an adjacent linked element, and
a second pair of opposing through-holes at a second end.

13. The method according to claim 12, wherein the stress exerted on the pipe is transferred to the linked elements.

14. The method according to claim 12, further comprising pre-calibrating the strapping device prior to installing the strapping device onto the pipe.

15. The method according to claim 12, further comprising wirelessly transmitting a measured stress exerted on the pipe to a remote location.

16. A method for non-invasively detecting pressure inside a pipe comprising:
(A) installing a strapping device onto an outer surface of the pipe, the strapping device comprising:
(i) a band for secureably clamping onto the outer surface of the pipe, wherein the band comprises a plurality of detachable linked elements; and
(ii) a substantially straight linked element, wherein a first end of the substantially straight linked element is coupled to at least one detachable linked element;
(iii) a sensor, wherein the sensor is mounted on the substantially straight linked element; and
(iv) a circuit board enclosure, wherein the circuit board enclosure is coupled to a second end of the substantially straight linked element; and
(B) measuring, using the processor, a change in an outer diameter of the pipe, wherein the change in the outer diameter of the pipe is associated with a corresponding change in pressure inside the pipe,
wherein the band comprises a plurality of detachable linked elements and
wherein each of the linked elements comprises:
a first pair of opposing through-holes at a first end for coupling to an adjacent linked element, and
a second pair of opposing through-holes at a second end.

17. The method according to claim 16, wherein the change in the outer diameter of the pipe is transferred to the linked elements.

18. The method according to claim 16, further comprising pre-calibrating the strapping device, wherein the pre-calibration comprises determining a change in the outer diameter of the pipe under a plurality of pressure conditions.

19. The method according to claim 16, wherein the strapping device detects the change in pressure inside the pipe without penetrating the inside of the pipe.

20. The method according to claim 16, further comprising at least one of dynamically calibrating the strapping device during its installation or pre-calibrating the strapping device at a manufacturing facility.

* * * * *